(12) United States Patent
Bertoni et al.

(10) Patent No.: US 8,774,768 B2
(45) Date of Patent: Jul. 8, 2014

(54) SYSTEM AND METHOD FOR SELECTING A MESSAGE SUITABLE FOR DELIVERY TO A USER OF TELECOMMUNICATIONS SERVICES

(75) Inventors: Yves Bertoni, Nozay (FR); Stéphane Betge Brezetz, Nozay (FR); Christophe Senot, Nozay (FR); Armen Aghasaryan, Nozay (FR)

(73) Assignee: Alcatel Lucent, Paris (FR)

( * ) Notice: Subject to any disclaimer, the term of this patent is extended or adjusted under 35 U.S.C. 154(b) by 530 days.

(21) Appl. No.: 12/420,168

(22) Filed: Apr. 8, 2009

(65) Prior Publication Data

US 2009/0280780 A1 Nov. 12, 2009

(30) Foreign Application Priority Data

Apr. 15, 2008 (FR) ...................................... 08 52523

(51) Int. Cl.
*H04L 12/58* (2006.01)

(52) U.S. Cl.
USPC ...................... 455/412.1; 455/435.1; 375/295; 709/228

(58) Field of Classification Search
USPC .............. 455/412.1, 435.1; 709/228; 375/295
See application file for complete search history.

(56) References Cited

U.S. PATENT DOCUMENTS

| 5,710,884 A * | 1/1998 | Dedrick ......................... 709/217 |
| 2007/0150606 A1* | 6/2007 | Flinchem et al. ............. 709/228 |
| 2007/0254651 A1* | 11/2007 | Sasaki ......................... 455/435.1 |
| 2008/0037683 A1* | 2/2008 | Han et al. ....................... 375/295 |
| 2009/0030774 A1* | 1/2009 | Rothschild et al. ............. 705/10 |

FOREIGN PATENT DOCUMENTS

JP 09-083991 4/1997

* cited by examiner

*Primary Examiner* — Kashif Siddiqui
*Assistant Examiner* — Shahriar Behnamian
(74) *Attorney, Agent, or Firm* — Fay Sharpe LLP

(57) ABSTRACT

The aim of the present invention is a system (100) for selecting a message suitable for delivery to a user (111) of telecommunications services. This system (100) comprises a first database (107) including a range of statuses characteristic of said user (111), each status occupying a specific place in a series of possible statuses, and transitions between the different statuses, a second database (108) including a range of messages suitable for broadcast to said user (111) and a third database (104) incorporating a history of messages already broadcast to said user (111). The system (100) also comprises a calculator (101) comprising transition detection means (112) and means of determining the current status of said user (111) based on data provided by said third database (104), means (113) of associating said current status with a message included in said second database and means (103; 115; 114) of determining the moment to broadcast said message to said user (111).

11 Claims, 2 Drawing Sheets

SYSTEM AND METHOD FOR SELECTING A MESSAGE SUITABLE FOR DELIVERY TO A USER OF TELECOMMUNICATIONS SERVICES

The present invention concerns a system and method for selecting a message suitable for delivery to a user of telecommunications services. The invention is more specifically adapted to the implementation of an advertising campaign allowing the broadcast of a message representing a brand or a product.

The issue of monitoring audiences targeted by advertisers is becoming increasingly complex when implementing campaigns intended to promote brands or products.

The multiplication of the multimedia services and devices used to broadcast these campaigns (mobile telephone, personal digital assistant, personal computer, television, etc.) complicates the issue further still.

In this context, the present invention aims to resolve these difficulties and provide a system for selecting a message suitable for delivery to a user of telecommunications services and used to automatically take into account the change in the behavior of this user and to automatically deliver to said user a message adapted to the changes in their behavior.

For this purpose, the invention proposes a system for selecting a message suitable for delivery to a user of telecommunications services, said system comprising:
  a first database including:
    a range of characteristic statuses of said user, each status occupying a specific place in a series of possible statuses;
    the possible transitions between the different statuses;
  a second database including a range of messages suitable for broadcast to said user;
  a third database incorporating a history of messages already broadcast to said user;
  a calculator including transition detection means and means of determining the current status of said user based on the data provided by said third database;
  means of associating said current status with a message included in said second database;
  means of determining the moment to broadcast said message to said user.

Through the invention, a characteristic status of the user is defined, occupying a certain place among a series of possible statuses, said status being used to monitor the evolution of the user in terms of the level of awareness and exposure to different messages already broadcast concerning a given product or brand. The calculator updates this status based on information from at least one database containing the exposure of the user to various messages relating to the product or to the brand (said database stores for example an identifier for the advertising messages already sent, the date said messages were sent and the recipients thereof, as well as the number of times recipients have received the same message). To do this, the calculator uses a status graph including transitions from one status to another.

From then on, the system matches the current status with the message to be broadcast adapted to this status: this matching allows automatic selection of the message adapted to the maturity status of the user.

Doing this, once the correct message is selected, it should be broadcast at the appropriate moment. For this purpose, the system according to the invention includes means of automatically determining the moment to broadcast said message.

The system according to the invention is therefore a tool used to monitor and estimate the position of consumers in relation to brands or products, then to pair this position with the advertising selection and allow the broadcast of this advertising selection at the appropriate moment.

This system constitutes a multimedia solution in the sense that it may operate with different platforms using different channels (broadcast of television programs to mobile terminals, broadcast of television programs over the Internet, broadcast of video to mobile terminals, etc.). The system is used not only to gather information concerning the different messages which the user has received on the different channels, but also to broadcast the selected message on a specific channel at a chosen time.

The system according to the invention may also have one or more of the characteristics below, taken individually or in accordance with all the combinations technically possible:
  said third base comprises:
    a list of the messages already broadcast,
    the broadcast date of these messages;
    the recipients of the messages already broadcast;
    the number of times said recipients have received the same message;
  the system according to the invention comprises a database, known as a profiling database, including profiling data for said user, said transition detection means and means of determining the current status of said user using the data included in said profiling database to detect said transition and determine said current status;
  the system according to the invention comprises a database, known as an interactivity database, including data relating to the interactivity between said user and messages already selected by said system and broadcast to the user, said transition detection means and means of determining the current status of said user using the data included in said interactivity database to detect said transition and determine said current status;
  said means of determining the moment to broadcast said message to said user are means which determine a time slot during which said message may be broadcast to the user when a service is in the process of being broadcast to said user;
  said means of determining the moment to broadcast said message to said user are means comprising a time counter used to trigger the broadcast of said message after a pre-determined time;
  said means of determining the moment to broadcast said message to said user are said message broadcast triggering means based on a pre-defined condition which must be met;
  said means of determining the moment to broadcast said message to said user incorporate means of selecting the appropriate broadcast channel for said message;
  the system according to the invention comprises an interface to configure:
    said first database by defining said characteristic statuses of the user for a given brand, category of product or product, as well as the transitions between the different statuses;
    said second database by defining the messages concerning said given brand or category of product or product associated with said statuses of said first database;
  the system according to the invention comprises a user interface module allowing communication of information between said user and said calculator, such that said user sends said calculator information which will be taken into consideration in the determination of the current status by said transition detection means and means of determining the current status of said user.

The present invention also aims to provide a network comprising a system according to the invention interfaced with at least one platform for delivery of services to communication terminals.

The present invention also aims to provide a method for selecting a message suitable for delivery to a user of telecommunications services, said method comprising the following stages implemented by computer:

- detection of a transition between a first status and a second status based on data relating to the history of messages already broadcast to said user, said first and second status occupying a different place in a series of statuses characteristic of said user, said second status becoming the current status of said user;
- association of said current status with a message selected from among a range of messages suitable for broadcast to said user;
- determination of the moment to broadcast said message to said user.

Other characteristics and advantages of the invention shall become clear from the description given below, by way of indication and in no way exhaustive, in reference to the figures in the appendix, in which:

FIG. 1 shows in diagram form a system 100 for selecting a message suitable for delivery to a user 111 of telecommunications services.

Figure 1:
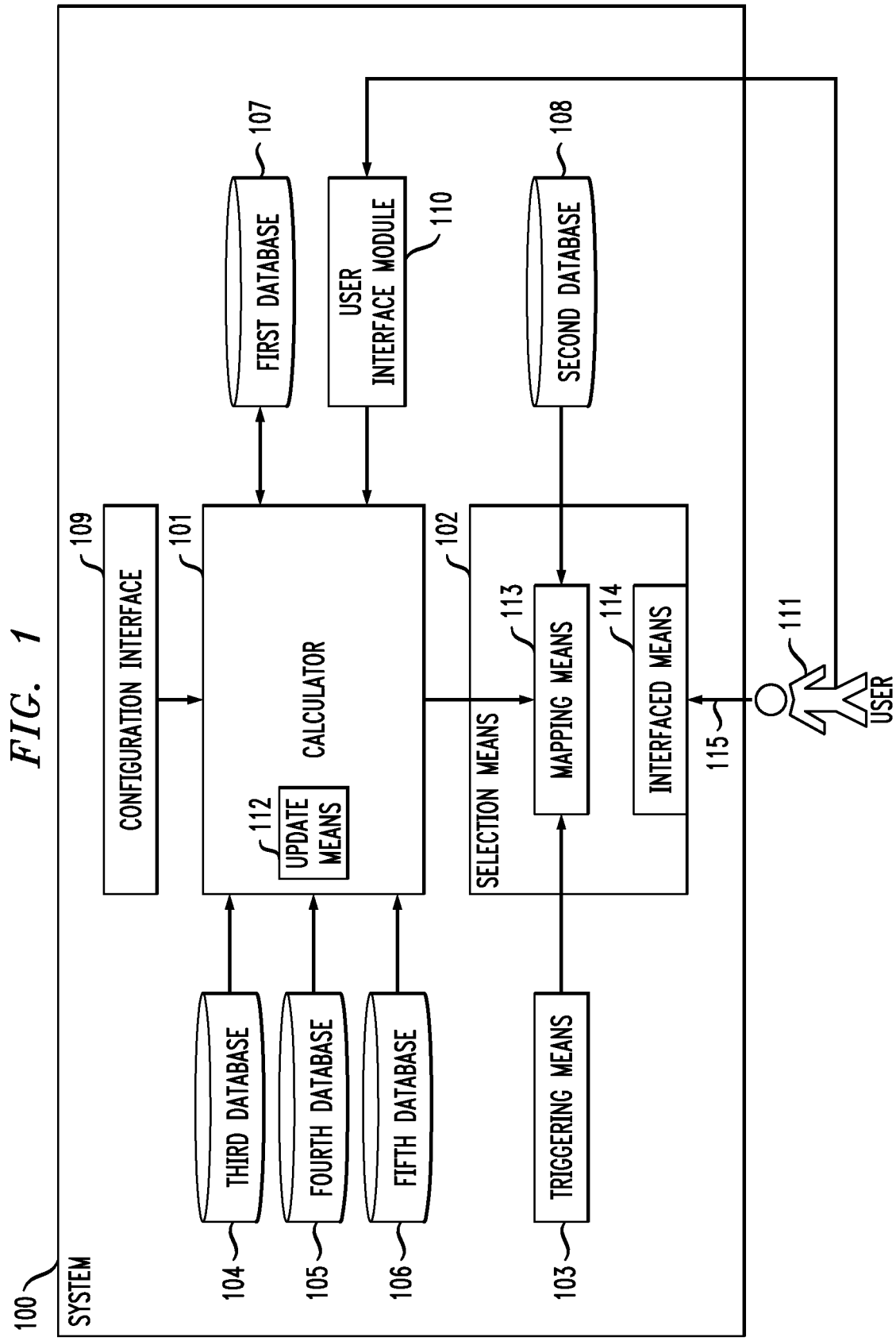
FIG. 1 is a representation in diagram form of the system according to the invention.

The system 100 comprises a first database 107 including:
- a range of characteristic statuses of the user for a given product or brand, each status occupying a specific place in a series of possible statuses;
- transitions between the different statuses.

The model defining the statuses and the transitions between statuses may for example be a decision tree, a Bayesian network type probabilistic graph or an expert system type rules engine. An example of a decision tree 200 will be described later in reference to FIG. 2. Each status indicates the position of a user with regard to a given brand, a given product, a given product, a given category of product or a consumption domain for a specific company.

The system 100 also comprises a second database 108 including a range of advertising messages or creations. It shall be noted that these messages are multimedia messages: in other words, these messages may be broadcast using different service delivery platforms using different channels (broadcast of television programs to mobile terminals, broadcast of television programs over the Internet, broadcast of video to mobile terminals, etc.). These service delivery platforms, not shown, are interfaced with the system 100 so as to be able to broadcast the advertising messages. This set of advertising messages forms an advertising campaign intended to be broadcast, at the right moment, to a targeted audience. As with the statuses, the messages represent a given brand, a given product, a given category of product or a consumption domain for a specific company, with each of said messages being intended for a specific target audience.

Below is an example of such a campaign concerning the advertising of a new product and comprising several messages, Ad1 to Ad3, targeted at a specific audience:

Message Ad1 intended for those people who know nothing about a new product;
Message Ad2 intended for those people already informed of the existence of this new product;
Message Ad3 intended for those people interested in the new product.

The system 100 according to the invention also comprises:
- a calculator 101;
- a third database 104;
- a fourth database 105;
- a fifth database 106.

The third, fourth and fifth databases 104, 105 and 106 supply the inputs for the calculator 101. The calculator 101 includes user status update means 112 by detecting transitions between the statuses contained in the first database 107.

The third database 104 incorporates a history of messages already broadcast to the users. As already mentioned above, the system 100 according to the invention allows the selection of advertising messages which are broadcast to a user based on the place said user occupies in a maturing process. The system 100 stores in the third database 104 the measure of the level of exposure of the user to the different messages already broadcast; in other words, the third database 104 stores an identifier for the advertising messages already sent, the date said messages were sent and the recipients thereof, as well as the number of times recipients have received the same message. Of course, the third database 104 stores the messages already proposed for broadcast to the different multimedia devices of the user so as to obtain information as precise as possible on the evolution of said user.

The fourth database 105 is a database comprising user profiling data constructed from collected data characterizing the profile of the user (personality, habits, age, gender, areas of interest, characteristics of their terminals such as the graphics interface) and a modeling of the user. This fourth database is for example interfaced with a profiling engine, not shown, allowing the generation of said profiling data. This profiling engine may operate in a multi-platform environment (i.e. several service delivery platforms accessible to a single user) so as to generate profiling data taking into account incorporated user data from the different platforms.

The fifth database 106 includes data concerning the interactivity between the user and the messages already broadcast to the user via a selection of the system according to the invention 100. This interactivity may take different forms. It may for example be a URL address activated by the user or a click by the user on offered content; it may also involve the use of a short code sent in SMS (Short Message Service) form allowing the user to show appreciation or interest for a product.

The means 112 of updating the status of a user from the different statuses and the transitions between these statuses defined in the first database 107 use the data provided by the third, fourth and fifth databases 104, 105 and 106 to determine the status of a user.

The system according to the invention 100 also comprises means 102 of selecting a message suitable for delivery to a user. The selection means 102 include current status mapping means 113 determined by the update means 112 with at least one of the messages Ad1 to Ad3 as defined above and included in the second database 108. Therefore on each change of status, the mapping means 113 automatically associate a new message with the new status. It is possible for the status to correspond to several messages; in this case, the system 100 according to the invention must include optimization means used to choose between several messages.

The system 100 also incorporates means of automatically determining the moment said message is broadcast to said user: these determining means may be of two types.

It may firstly involve means 114 interfaced with the services broadcast to the user 111 (the arrow 115 illustrates this interfacing); the means 114 determine a time slot during which the message may be broadcast when a service is broadcast. The user 111 is for example watching television and the means 114 determine the slot during which it is possible to send advertising via a cut or a pop-up for example. Note that the compatibility between the content of the service viewed by the user and the message may also be taken into account (for example, the content of a pop-up broadcast can be adapted to the subject of the video watched by the user).

It may also involve triggering means 103 which operate outside the context of the use of a service by the user. The means 103 then comprise a time counter used to trigger the broadcast of the message after a pre-determined time following the change of status. According to another alternative, the triggering means 103 may trigger the broadcast of the message in accordance with a pre-defined condition which must be met: for example, the means 103 trigger the broadcast of an advertising message for a new brand of umbrella based on the weather conditions (in the case of rain for example). The broadcast of the message following the triggering caused by the triggering means 103 may be carried out through a direct user request, by selecting an appropriate channel: e-mail, SMS, etc. The means 103 can therefore also incorporate means of selecting the appropriate broadcast channel for said message.

The system 100 according to the invention also comprises a configuration interface 109 allowing, for example, an advertiser wishing to implement an advertising campaign or a software agent responsible for this implementation, to configure:
- the first database 107 by defining the characteristic statuses of the user for a given product or brand, as well as the transitions between the different statuses;
- the second database 108 by defining the creations with regard to a given brand or product associated with the statuses of the first database 107.

The system 100 according to the invention also includes a user interface module 110 allowing communication of information from the user 111 to the calculator 101: this module 110 in particular allows the user 111 himself to indicate to the calculator 101 information relating to his maturity status, information which will be taken into consideration in the determination of the current status by the updating means 112.

Figure 2:
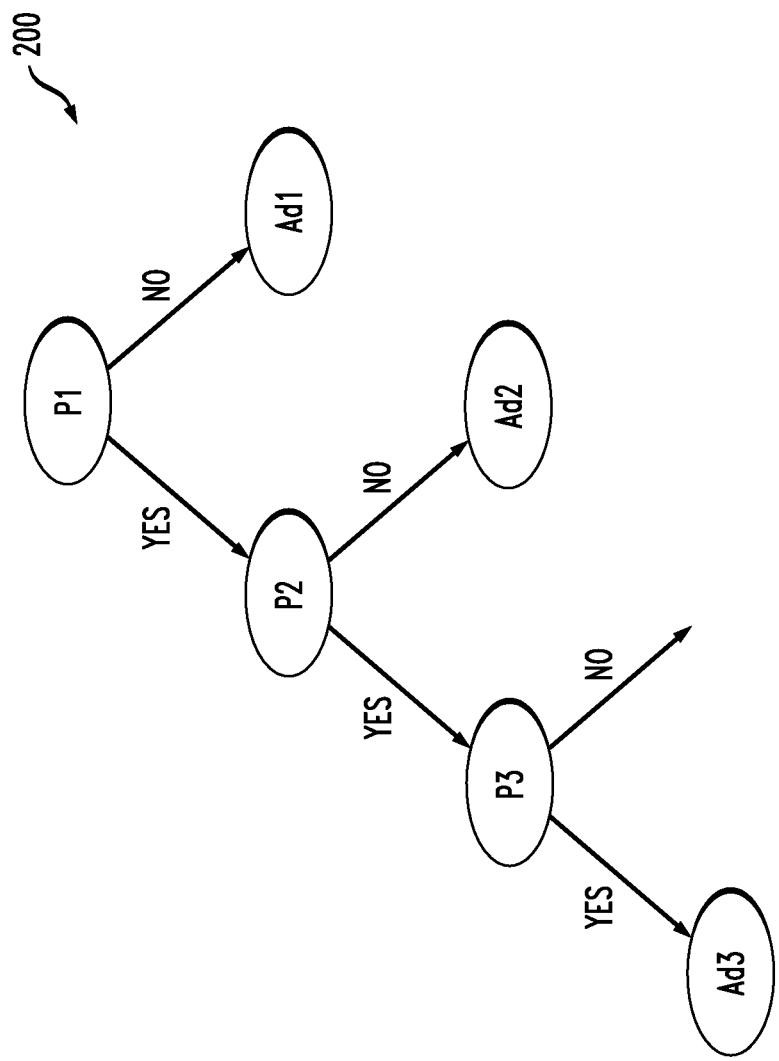
FIG. 2 illustrates an example of a decision tree used by the system according to the invention.

An example of a decision tree 200 is shown in FIG. 2 in the case of an advertising campaign comprising the messages Ad1 to Ad3 defined above. The tree 200 comprises three nodes, each corresponding to a predicate P1 to P3:
- P1 is the predicate: "the user knows the new product";
- P2 is the predicate: "the user is interested in the new product";
- P3 is the predicate: "the user is prepared to acquire the new product".

From then on, four statuses can be defined for the user which are, in order of transition:
- Status 1: the user does not know the new product;
- Status 2: the user knows the new product;
- Status 3: the user is interested in the new product;
- Status 4: the user is prepared to acquire the new product.

By way of example, the rule for transition from status 1 to status 2 corresponds to the response "yes" to the predicate P1: it may for example be triggered by the fact that the user has received a sufficient number of advertising messages relating to the new product: the user has progressed in the maturing process. This exposure information is provided to the status updated means 112 by the third database 104 which is used to take into account the maturity level of the user. The transition from status 1 to status 2 may also be triggered using information from the fourth profiling database 105 (the user profile indicates for example a potential interest in the technology associated with the product).

The rule for transition from status 2 to status 3 corresponds to the response "yes" to the predicate P2: it may for example be triggered by the viewing of an advertising message in full and/or by the sending of a text message and/or by at least one click on content in response to a question of the type "do you like the product". This information is provided to the status update means 112 by the fifth database 106 which is used to take into account the interactivity of users with the messages broadcast to them.

The rule for transition from status 2 to status 3 corresponds to the response "yes" to the predicate P2: it may be triggered by clicking on content to request information on the product (this again is information contained in the fifth database 106).

At the start of the advertising campaign, all users have a current status which is initialized at status 1.

All functional means described in reference to FIG. 1 are software means implemented by computer.

Of course, the invention is not limited to the embodiment which has just been described.

In particular, the means shown on FIG. 1 are functional units which may or may not correspond to distinguishable units. For example, these means may be grouped in a single software component. In contrast, certain means may if necessary consist of separate software entities.

Furthermore, the first database may include several series of statuses (as well as the transitions between these statuses for each series), each series corresponding to a given brand, a given product, a given category of product or a consumption domain for a specific company.

The invention claimed is:

1. A system that selects a message suitable for delivery to a user of telecommunications services, said system comprising:
- a first database including:
  - a range of characteristic statuses of said user, each status occupying a specific place in a series of possible statuses; and
  - transitions between different statuses;
- a second database including a range of messages suitable for broadcast to said user;
- a third database incorporating a history of messages already broadcast to said user, said third database including:
  - a list of the messages already broadcast,
  - the broadcast date of these messages;
  - the recipients of the messages already broadcast; and
  - the number of times said recipients received the same message;
- a calculator including a transition detector and first determining part that determines the current status of said user based on the number of times the user has received the same message as indicated in data provided by said third database;
- an associating part that associates said current status with a message included in said second database; and
- a second determining part that determines a moment to broadcast said message to said user.

2. The system according to claim 1, further comprising a profiling database including profiling data of said user, said transition detector and first determining part using data included in said profiling database to detect said transition and determine said current status.

3. The system according to claim 1, further comprising an interactivity database including data relating to interactivity between said user and the messages already selected by said system and broadcast to the user, said transition detector and first determining part using the data included in said interactivity database to detect said transition and determine said current status.

4. The system according to claim 1, wherein said second determining part determines a time slot during which said message can be broadcast to the user when a service is in the process of being broadcast to said user.

5. The system according to claim 1, wherein said second determining part includes a time counter used to trigger the broadcast of said message after a pre-determined time.

6. The system according to claim 1, wherein said second determining part triggers the broadcast of said message in accordance with a pre-defined condition which must be met.

7. The system according to claim 5, wherein said second determining part incorporates a selector that selects an appropriate broadcast channel for said message.

8. The system according to claim 1 comprising an interface operative to configure:
   said first database by defining said characteristic statuses of the user for a given brand, category of product or product, as well as the transitions between the different statuses; and
   said second database by defining the messages with regard to said given brand or category of product or product associated with said statuses of said first database.

9. The system according to claim 1 comprising a user interface module allowing communication of information between said user and said calculator, such that said user sends said calculator information which will be taken into consideration in the determination of the current status by said transition detector and first determining part.

10. The system according to claim 1 included in a network and interfaced with at least one service delivery platform to communication terminals.

11. A method of selecting a message suitable for delivery to a user of telecommunications services, said method comprising the following steps implemented by a computer:
   providing:
      a first database including:
         a range of characteristic statuses of said user, each status occupying a specific place in a series of possible statuses; and
         transitions between different statuses;
      a second database including a range of messages suitable for broadcast to said user; and
      a third database incorporating a history of messages already broadcast to said user, said third database including:
      a list of the messages already broadcast,
      the broadcast date of these messages;
      the recipients of the messages already broadcast; and
      the number of times said recipients received the same message;
   determining a current status of said user based on a number of times a same message was already broadcast to said user as indicated in data provided by said third database;
   associating said current status with a message included in said second database; and
   determining a moment to broadcast said message to said user.

* * * * *